June 15, 1926.  
J. A. MARTOCELLO  
1,588,898  
QUICK OPENING AND CLOSING CHECK VALVE FOR AERATING SYSTEMS  
Filed July 21, 1925
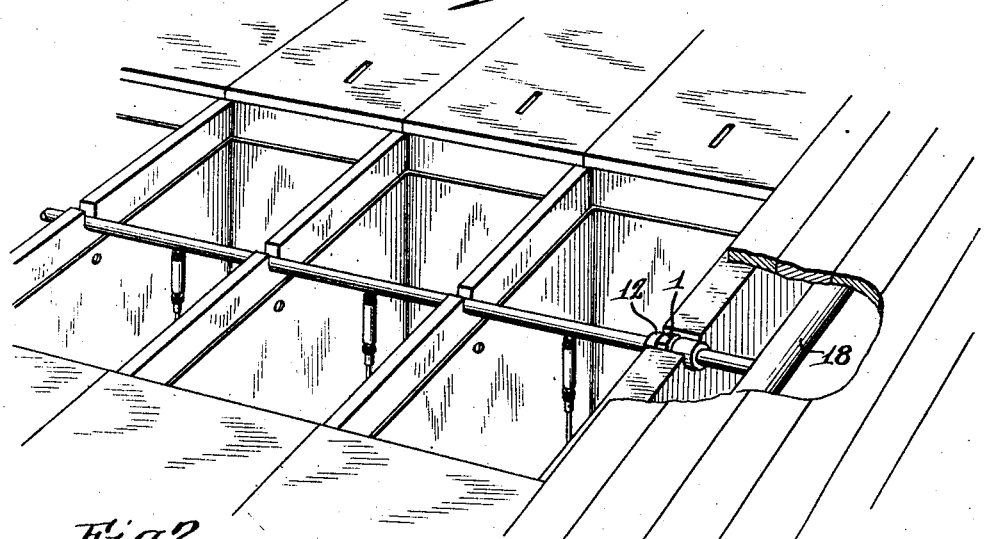
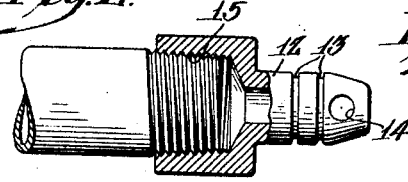
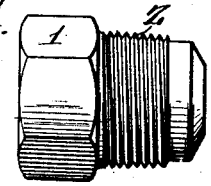
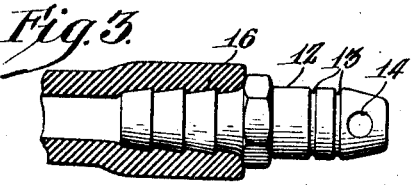
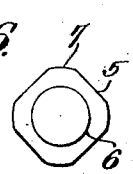
Inventor  
Joseph A. Martocello  
by  
Donald L. Maxson  
Attorney Patented June 15, 1926.

1,588,898

UNITED STATES PATENT OFFICE.

JOSEPH A. MARTOCELLO, OF PHILADELPHIA, PENNSYLVANIA.

QUICK OPENING AND CLOSING CHECK VALVE FOR AERATING SYSTEMS.

Application filed July 21, 1925. Serial No. 44,993.

This invention relates to improvements in automatic check valves for use in connection with aerating equipment on ice tanks of high or low pressure aerating systems.

An object of the invention is to provide a quick opening and closing check valve which will be used in connection with high or low pressure aerating systems, and which may be employed in a header, lateral, hose connection, or wherever desired.

A further object of the invention is to provide a quick opening and closing check valve, which will be so arranged that any desired adjustment may be had on the valve packing, whereby the said valve may be used equally well in a high or low pressure aerating system.

Other objects will appear as the description proceeds.

In the accompanying drawings which form a part of my application,

Figure 1 is a perspective view of a portion of a series drop tube system showing my improved valves in operative position;

Figure 2 is a side elevation partly in section showing the stem carrying portion of the valve connected to a pipe;

Figure 3 is a side elevation partly in section showing the stem carrying portion of the valve connected to a hose;

Figure 4 is a side elevation of the valve housing;

Figure 5 is a sectional view of the valve housing in operative position within a header;

Figure 6 is a plan view of the valve, and

Figure 7 is a side elevation of the valve.

Like characters of reference are used throughout the following specification and the accompanying drawings to designate corresponding parts.

As previously mentioned my improved quick opening and closing check valve may be used equally well in connection with high or low pressure aerating systems, and can be readily adjusted so that the tension on the valve stem when inserted within the packing may be varied according to the pressure of air within the headers and laterals.

The valve housing 1 is threaded at 2, so that the same may be secured in a header or lateral. A shoulder 3 is formed on the interior surface of the housing 1, and provides a seat for the compressible packing 4. The packing 4, in turn provides a seat for the valve 5, which is formed with a central boss 6, and has its corners rounded off as at 7. A coil spring 8 is disposed about the boss 6, and terminates at its opposite end against the seat 9, at the inner end of the valve housing 1. A passage 10 is provided at the inner end of the housing 1, and permits of the ready flow of air through the same, when the valve is forced off of its seat on the packing 4. A lock nut or retainer ring 11 is threaded into the outer end of the housing 1, and may be forced down against the packing 4, to vary the tension on the packing, for exerting more or less pressure on the valve stem when inserted within the said packing.

The valve stem 12 is provided with one or more annular notches 13, into which the packing may be pressed when the stem is in position within the valve housing 1. One or more lateral openings 14 are formed in the tapered end of the stem 12, and communicate with an internal longitudinal passage through the stem. The inner end of the stem, may be provided with an internally threaded head 15 for attachment to a pipe line, or lateral, or the inner end of the stem may be provided with a flanged head 16 for attachment to a hose 17.

The mode of operation of my improved quick opening and closing check valve is as follows: Assuming that the valve housing 1 is in operative position within a header 18, or in any place desired, it will be readily seen that the valve will normally be held closed due to the pressure of the air and of the spring at the back thereof. As soon as the valve stem 12, is inserted within the housing 1, it forces the valve off its seat, and permits the pressure of air to pass around the flattened sides of the valve and through the passages in the tapered end of the stem and through the hose or pipe connected with the valve stem.

It will be clearly seen that the instant the valve stem is withdrawn from the housing, the valve will close and cut off the passage of air. It will be further seen that the packing may be compressed by turning down on the threaded ferrule, in order that there will be no leakage of air, and also to provide for the efficient use of the valve with either high or low pressure systems.

Many minor changes in detail of construction may be resorted to without departure from the spirit of the invention.

Having thus described my invention what

I claim as new and desire to secure by Letters Patent of the United States is:

A device of the character described comprising a header, a valve housing removably secured thereto, a shoulder formed in said housing, a compressible packing washer seating on said shoulder and provided with a central bore, means in said housing for variably compressing said washer against said shoulder whereby to vary the diameter of said bore, a second shoulder formed in said housing inward of said first mentioned shoulder, a valve normally seating on said washer, resilient means engaging said valve and said second mentioned shoulder, and means adapted to be inserted through the bore in said washer in fluid tight relation therewith for opening said valve, said valve instantly closing when said last mentioned means is withdrawn.

In testimony whereof I affix my signature.

JOSEPH A. MARTOCELLO.